United States Patent [19]

Fernsler

[11] 4,144,544

[45] Mar. 13, 1979

[54] TELEVISION HORIZONTAL OSCILLATOR FREQUENCY CONTROL ARRANGEMENT FOR USE WITH TAPE RECORDER

[75] Inventor: Ronald E. Fernsler, Indianapolis, Ind.

[73] Assignee: RCA Corporation, New York, N.Y.

[21] Appl. No.: 862,177

[22] Filed: Dec. 19, 1977

[51] Int. Cl.² ............................................. H04N 5/04
[52] U.S. Cl. .................................................. 358/158
[58] Field of Search ............... 358/148, 158, 159, 127

[56] References Cited

U.S. PATENT DOCUMENTS

| 3,740,489 | 6/1973 | Willis | 358/158 |
| 3,846,584 | 11/1974 | Itoh et al. | 358/158 |

Primary Examiner—Richard Murray
Attorney, Agent, or Firm—Eugene M. Whitacre; Paul J. Rasmussen; William H. Meise

[57] ABSTRACT

A television receiver used in conjunction with a video tape recorder having a step change in phase of the horizontal synchronizing pulse occurring prior to the vertical blanking signal produces a distorted video display. The video distortion results from too slow slewing of the horizontal oscillator phase-locked loop to the new phase. In order to reduce the video distortion, the phase-locked loop filter is switched to a high gain condition at a time before the end of the vertical scanning interval.

14 Claims, 2 Drawing Figures

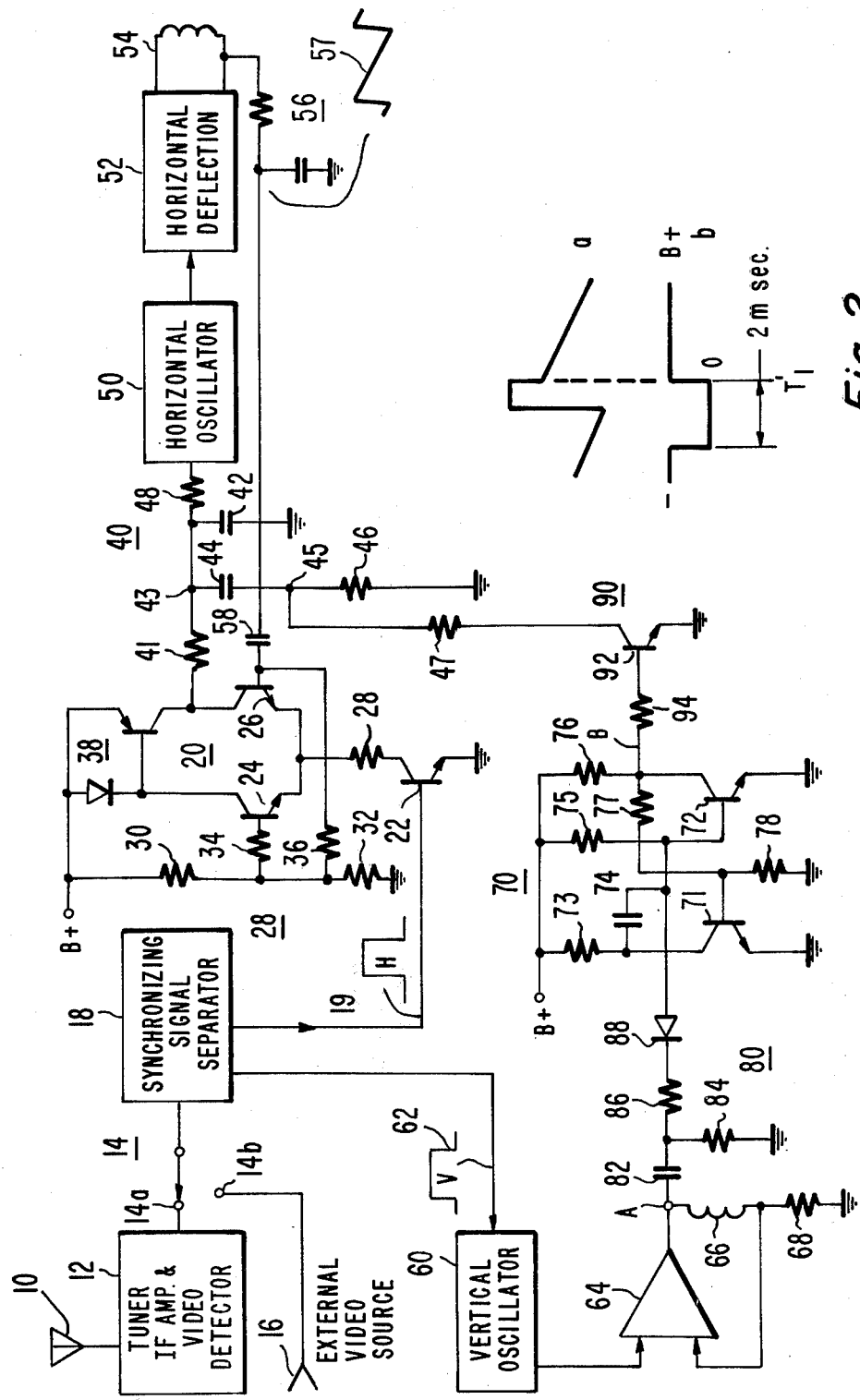

TELEVISION HORIZONTAL OSCILLATOR FREQUENCY CONTROL ARRANGEMENT FOR USE WITH TAPE RECORDER

This invention relates to phase-locked loops and more particularly to television horizontal oscillator phase-locked loops for use in conjunction with video tape playback devices.

The raster of a television display is formed by one or more electron beams caused to scan by horizontal-and vertical deflection rate signals which are synchronized with synchronizing signals associated with the video to be displayed. Since the video may contain noise components, it is customary to provide the television device with noise immunity in the form of a phase-locked loop, in which a controllable horizontal-frequency oscillator is coupled in a feedback loop with a phase-sensitive detector and a low-pass filter, whereby the phase detector produces pulses representative of the difference in phase between the controlled oscillator and the horizontal synchronizing pulses associated with the video. The pulses produced by the phase detector are filtered by a low-pass filter, the output of which is coupled to the control input of the oscillator, and the oscillator rate is thereby maintained equal to the average syncrhonizing pulse rate.

Often it will be desired to use a television display device in conjunction with a video tape recorder or playback device. Such video tape recorders commonly use a plurality of reproduction heads, each of which is mechanically scanned across the tape. In one common scheme, two heads are used, which alternately scan the tape for a duration equal to that of a vertical field. In order to avoid loss of or breaks in the displayed information, the succeeding field scanning is commenced by the second head substantially concurrently with the end of scanning in the first head. However, slight differences in tape tension or in the dimensions of the mechanical tape transport acting on the tape for playback compared with the tension and dimensions when the tape was recorded results in differences in the time between succeeding horizontal synchronizing pulses in the information as recorded as compared with playback, especially during the switchover between heads. This results in a discontinuity or step in the phase of the horizontal synchronizing pulses available for synchronizing the horizontal oscillator and for controlling the raster. This step in phase normally occurs about five horizontal lines before the end of a vertical scanning interval.

Such a step change of phase will cause the phase-lock loop to control the horizontal oscillator in such a manner as to cause the oscillator phase to change and accommodate itself to the altered phase of the synchronizing signals. However, the gain characteristics of the low-pass filter of the phase-locked loop normally prevent the controlled oscillator from changing at a rate great enough to readjust itself before the end of the vertical blanking interval. This may result in distortion of the displayed video.

U.S. Pat. No. 3,740,489 issued on June 19, 1973 in the name of D. Willis describes an external switch by which the user may change the characteristics of the low-pass filter in the phase-locked loop when using a tape recorder. This alters the loop gain characteristics of the phase-locked loop, allowing the oscillator to change phase or slew at a greater rate. However, the user may forget to throw the switch, thereby permitting the aforementioned video distortion, or may forget to return the switch to its normal condition when receiving transmitted signals, which will make the television receiver horizontal syncrhonization more sensitive to noise.

It is also known from U.S. Pat. No. 3,846,584 issued on Nov. 9, 1974 in the name of Itoh et al., to completely disconnect the low-pass filter from the phase-locked loop for a predetermined limited period of time following the appearance of the vertical synchronizing signal. With such an arrangement, when the phase discontinuity occurs prior to the vertical synchronizing signal, the display may be distorted for the last few lines of video, and the phase-lock loop may have insufficient time to complete slewing of the horizontal oscillator before the end of the vertical blanking interval and the beginning of video display. While the slew rate may be increased by increasing the loop gain, this may result in a "scalloping" distortion of vertical lines near the top of vertical scan resulting from excessive phase-lock loop gain.

SUMMARY OF THE INVENTION

A horizontal oscillator frequency control arrangement for synchronizing a horizontal oscillator with a source of synchronizing pulses which may have a changing phase occurring at the vertical deflection rate includes a controllable horizontal rate oscillator for producing horizontal rate oscillations with controllable frequency and phase. A horizontal deflection arrangement is coupled to the horizontal rate oscillator and causes deflection current to flow in synchronism with the oscillations. A phase detector has one input coupled to the horizontal deflection circuit output and another coupled to the source of horizontal synchronizing pulses and produces phase control signals representing the difference in frequency and phase between the two. A filter having controllable characteristics is coupled to the output of the phase detector and to the horizontal rate oscillator for averaging the phase control signals for controlling the horizontal rate oscillator. A control circuit responsive to the source of vertical synchronizing pulses recurrently varies the characteristics of the filter at the vertical rate, and a delay arrangement coupled between the control circuit and the source of vertical synchronizing signals delays the operation of the control circuit for a predetermined interval after the occurrence of the synchronizing signal.

DESCRIPTION OF THE DRAWINGS

FIG. 1 is a diagram partially in block and partially in schematic form of a portion of a television receiver embodying the invention; and FIG. 2 illustrates vertical-rate voltage-time waveforms occurring in the arrangement of FIG. 1 during operation.

DESCRIPTION OF THE INVENTION

FIG. 1 illustrates a portion of a television receiver adapted to receiving transmitted or broadcast signals and signals from an external video source. In FIG. 1, an antenna 10 is arranged to receive transmitted television signals modulated onto a carrier. A tuner, IF amplifier and video detector arrangement 12 is coupled to antenna 10 and is adapted to recovering video modulation from the transmitted signal. The video is made available at a terminal 14a of a selector switch 14. An external video jack 16 is coupled to terminal 14b of switch 14.

Video selected by switch 14 is applied to an input of a synchronizing signal separator 18. Separator 18 separates horizontal synchronizing pulses illustrated as waveform 19 from the composite video and applies them to the base of a transistor 22, which forms one input of a phase detector designated generally as 20. Phase detector 20 includes emitter-coupled transistors 24 and 26, the emitters of which are coupled to the collector of transistor 22 by a resistor 28. The bases of transistors 24 and 26 receive a direct biasing voltage from a resistive voltage divider designated generally as 28 coupled between B+ and ground and including resistors 30 and 32. The bases of transistors 24 and 26 are coupled to the tap on voltage divider 28 by resistors 34 and 36, respectively. A current mirror designated generally as 38 has an input coupled to the collector of transistor 24 and an output coupled to the collector of transistor 26 and is used as a differential-to-single-ended converter for forming a high-impedance output terminal of phase comparator 20 at the collector of transistor 26.

The output of comparator 20 is coupled to the input of a filter 40 comprising a resistor 41 and a high-frequency rolloff capacitor 42 coupled between the filter input and ground, and having a junction 43 therebetween. Filter 40 also includes a low-frequency averaging capacitor 44 coupled with a resistor 46 at a junction 45, forming a serial connection between junction 43 and ground, and an impedance setting resistor 48 coupled from junction 43 to a low-impedance input of a horizontal oscillator 50.

Horizontal oscillator 50 has its frequency and phase controlled by the input from filter 40, and produces horizontal-rate pulses which are applied to a horizontal deflection circuit illustrated as block 52, which promotes the flow of deflection current in a horizontal deflection winding 54 associated with a kinescope, not shown. The deflection voltage resulting from the flow of deflection current in deflection winding 54 is applied to an integrator designated generally as 56 coupled to winding 54. Integrator 56 forms horizontal-rate sawtooth voltages illustrated as waveform 57 from the pulsatory deflection voltage and applies them to the base of transistor 26 of phase detector 20 through a coupling capacitor 58. Sawtooth voltages 57 are compared with the horizontal synchronizing pulses in phase detector 20, which responds with current pulses representing the frequency and phase differences between sawtooth waveforms 57 and horizontal synchronizing pulses 19.

Synchronizing signal separator 18 also separates vertical synchronizing signals illustrated as 62 from the composite video selected by switch 14. The vertical synchronizing signals are applied to a vertical-frequency oscillator 60, which produces oscillations in synchronism with the vertical synchronizing pulses. Vertical-rate pulses from oscillator 60 are applied to an input of a vertical deflection amplifier 64, the output of which drives a vertical deflection winding 66 associated with the kinescope. A current sensing resistor 68 is coupled in series with winding 66 and couples a feedback voltage to an input of amplifier 64.

The voltage appearing at the output A of amplifier 64 and illustrated in FIG. 2a is applied to a monostable multivibrator designated generally as 70 by way of a differentiating and coupling circuit designated generally as 80. Coupling circuit 80 includes a differentiator formed by a capacitor 82 and a resistor 84, and coupling between the differentiator and a trigger input of multivibrator 70 is by way of a resistor 86 and a diode 88.

The anode of diode 88 is coupled to the base of a transistor 72 of multivibrator 70 and to B+ by a resistor 75. The emitter of transistor 72 is grounded, and the collector is connected to B+ through a resistor 76. The collector-to-emitter path of transistor 72 is paralleled by a voltage divider consisting of resistors 77 and 78. The base-emitter junction of a transistor 71 is coupled across resistor 78, and its collector is coupled to B+ through a resistor 73. The collector of transistor 71 is connected to the base of transistor 72 by way of a timing capacitor 74.

The collector of transistor 72, designated B, forms the output of multivibrator 70. Point B is coupled to the base of a transistor 92 of a control circuit designated generally as 90 by way of a resistor 94. The emitter of transistor 92 is grounded, and the collector is connected to junction 45 by a resistor 47. The collector-to-emitter path of transistor 92 provides a controllable path by which resistor 47 may be coupled in parallel with resistor 46 to change the characteristics which filter 40 presents to the phase detector control signal, without perturbing the filter voltage at the time the change occurs.

In operation during the principal portion of the vertical scanning interval, multivibrator 70 is in its astable condition with transistor 71 ON and transistor 72 biased OFF by reverse base-emitter bias provided by capacitor 74. As the charge on capacitor 74 changes by current flow through resistor 75, the reverse bias on the base of transistor 72 is progressively reduced. Point B is at B+ and transistor 92 is conductive, paralleling resistor 46 with resistor 47. Sawtooth waveforms 57 are compared with horizontal synchronizing pulses 19 in phase comparator 20, which produces current pulses dependent upon the degree of phase agreement. The current from the output of comparator 20 flows through resistors 41 and 48, producing voltage pulses which are averaged by capacitors 42 and 44 to form a control voltage by which horizontal oscillator 50 is controlled. Depending upon their spectral frequency distribution, the voltage pulses will be attenuated by an amount depending upon the magnitude of the resistance in series with capacitor 44. With transistor 92 conductive and resistor 47 paralleling resistor 46, the attenuation of filter 40 within the particular frequency range will be relatively high, so the phase-lock loop gain in that range is low for proper noise immunity.

A few lines before the end of the vertical scanning interval, just prior to the time at which a step change in phase is expected to occur in the horizontal synchronizing pulses from a video tape recorder, the voltage on capacitor 74 has discharged to a point at which the base-emitter junction of transistor 72 becomes forward biased. Transistor 72 begins to conduct, the voltage at point B drops to the saturation voltage of transistor 72, and transistor 71 becomes nonconductive. This is the stable state of multivibrator 70. The low voltage at point B removes base-emitter bias from transistor 92 and it becomes nonconductive, removing resistor 47 from the circuit of filter 40 and reducing the attenuation of the filter to control signals within a particular frequency range. The reduced attenuation of filter 40 results in a higher loop gain for the phase-lock loop.

When operating from broadcast signals rather than from a tape playback, there will be no substantial change in phase in the following interval, and the increased loop gain of the loop does not effect any change in oscillator 50 operation. When the input is a tape playback, a change in phase may occur a short time after multivibrator 70 assumes its stable state. Phase detector 20 detects this change of phase, and the control signals produced by phase detector 20 cause horizontal oscillator 50 to slew at a rate which is increased by comparison with that of the low-gain condition. Oscillator 50 begins to slew towards the new phase immedaitely prior to the vertical blanking interval and for substantially the entire succeeding blanking interval. Near the end of the vertical blanking interval, the vertical retrace interval ends at a time T1. At this time, differentiating and coupling circuit 80 couples a negative-going signal to the base of transistor 72 to reset multivibrator 70 to its astable mode. As shown in FIG. 2b, the voltage at point B rises towards B+ at the beginning of vertical scanning. This once again renders transistor 92 conductive and parallels resistor 46 with resistor 47, decreasing the filter gain to enhance noise immunity during the vertical scanning interval.

The inventive arrangement allows the television receiver to be conditioned for reception of synchronizing signals from a video tape recorder having a step change in phase occurring prior to the vertical blanking interval, while at the same time retaining during substantially the entire vertical scanning interval the noise immunity normally resulting from the use of a phase-locked loop optimized for broadcast signal reception. No switch operated by the user is required, as control is continuously in operation during both kinds of reception. Also, noise components in the video from the tape recorder occurring during the vertical scanning interval are discriminated against.

Other embodiments of the invention will be apparent to those skilled in the art. For example, delays may be accomplished by means other than a multivibrator, and various forms of loop filters may be adapted as the need may arise. Also, many types of conventional phase detectors are adaptable for use with the invention.

In a particular embodiment of the invention, the following component values were found to give satisfactory operation:

| Capacitors | Farads |
| --- | --- |
| 42 | 4700 p |
| 44 | 1.0 μ |
| 74 | 0.27 μ |
| 82 | 0.047 μ |
| Resistors | OHMS |
| 46 | 33k |
| 47 | 3300k |
| 48 | 130k |
| 73 | 2400 |
| 75 | 139k |
| 76 | 10k |
| 77 | 100k |
| 78 | 10k |
| 84 | 3300 |
| 86 | 18k |
| 94 | 15k |

What is claimed is:

1. A horizontal oscillator frequency control arrangement for synchronizing a horizontal oscillator with a source of synchronizing pulses which may have a change in phase occurring at the vertical deflection rate, comprising:
   controllable horizontal rate oscillator means for producing horizontal rate oscillations the frequency and phase of which are controllable;
   horizontal deflection means coupled to said horizontal rate oscillator means for promoting deflection current in synchronism with said oscillations;
   phase detection means coupled to said horizontal deflection means and to the source of horizontal synchronizing pulses and responsive to said deflection current and to the horizontal synchronizing pulses for producing phase control signals representing the difference in frequency and phase therebetween;
   controllable filter means coupled to said phase detector means and to said horizontal rate oscillator means for producing an averaged signal for controlling said oscillator, said filter means having a variable frequency-amplitude characteristic;
   a source of synchronizing signals at said vertical deflection rate;
   control means responsive to said source of vertical rate synchronizing signals and coupled to said controllable filter means for recurrently varying said characteristic at the vertical rate; and
   delay means coupled to said control means and to said source of vertical rate synchronizing signals for delaying operation of said control means for a predetermined interval after occurrence of said vertical synchronizing signal.

2. An arrangement according to claim 1 wherein said control means comprises a switch.

3. An arrangement according to claim 1 wherein said delay means comprises a multivibrator.

4. A horizontal oscillator frequency control arrangement according to claim 1 wherein; said controllable filter means comprises:
   first capacitance means coupled to the input of said filter means;
   first resistance means coupled with said capacitance means thereby forming a time constant; and
   a control terminal for varying said time constant.

5. A horizontal oscillator frequency control arrangement according to claim 4, wherein said control means comprises switch means coupled to said control terminal of said controllable filter means.

6. A horizontal oscillator frequency control arrangement according to claim 4, wherein said control means comprises controllable resistance means coupled to said control terminal for varying said time constant.

7. A horizontal oscillator frequency control arrangement according to claim 4 wherein said control means comprises switchable resistance means coupled to said control terminal for varying said time constant in a stepwise fashion.

8. A horizontal oscillator frequency control arrangement according to claim 7 wherein said switchable resistance means is coupled by said control terminal in parallel with said first resistance means.

9. A horizontal oscillator frequency control arrangement according to claim 8 wherein said first resistance means is serially coupled with said capacitance means.

10. A horizontal oscillator frequency control arrangement according to claim 8 wherein said switchable resistance means comprises third resistance means serially coupled with the controlled current path of a semiconductor switching means.

11. A horizontal oscillator frequency control means according to claim 1 wherein:
   said controllable filter means comprises first capacitance means coupled with first resistance means thereby forming a time constant;

said control means comprises controllable resistance means coupled with said first resistance means for controllably varying said time constant;

said source of synchronizing signals at said vertical deflection rate comprises a source of signals commencing substantially concurrently with the vertical synchronizing signals; and said delay means comprises multivibrator means coupled to said source of signals commencing substantially concurrently with said vertical synchronizing signals and coupled to said controllable resistance means for delaying variation of said time constant for a predetermined interval following said vertical synchronizing signals.

12. A horizontal oscillator frequency control arrangement according to claim 11 wherein:

said first resistance means is serially coupled with said first capacitance means;

said controllable resistance means is coupled in parallel with said first resistance means; and said multivibrator means comprises monostable multivibrator means having a delay in the astable condition substantially less than the duration of one vertical scanning interval.

13. A horizontal oscillator frequency control arrangement according to claim 11 wherein said control means comprises switchable resistance means coupled in parallel with said first resistance means; and said first resistance means is serially coupled with said first capacitance means.

14. A horizontal oscillator frequency control arrangement according to claim 1 wherein:

said delay means recurrently delays operation of said control means for an interval substantially greater than half the interval between said synchronizing signals at said vertical rate; and said attenuation is recurrently reduced for an interval substantially less than the vertical deflection interval defined by said vertical deflection rate; and said synchronizing signals at said vertical rate occur during said interval in which said attenuation is reduced.

* * * * *